Nov. 22, 1927.
C. S. McKENNEY
1,650,527
TRUNK CARRIER FOR AUTOMOBILES
Filed Nov. 30, 1926
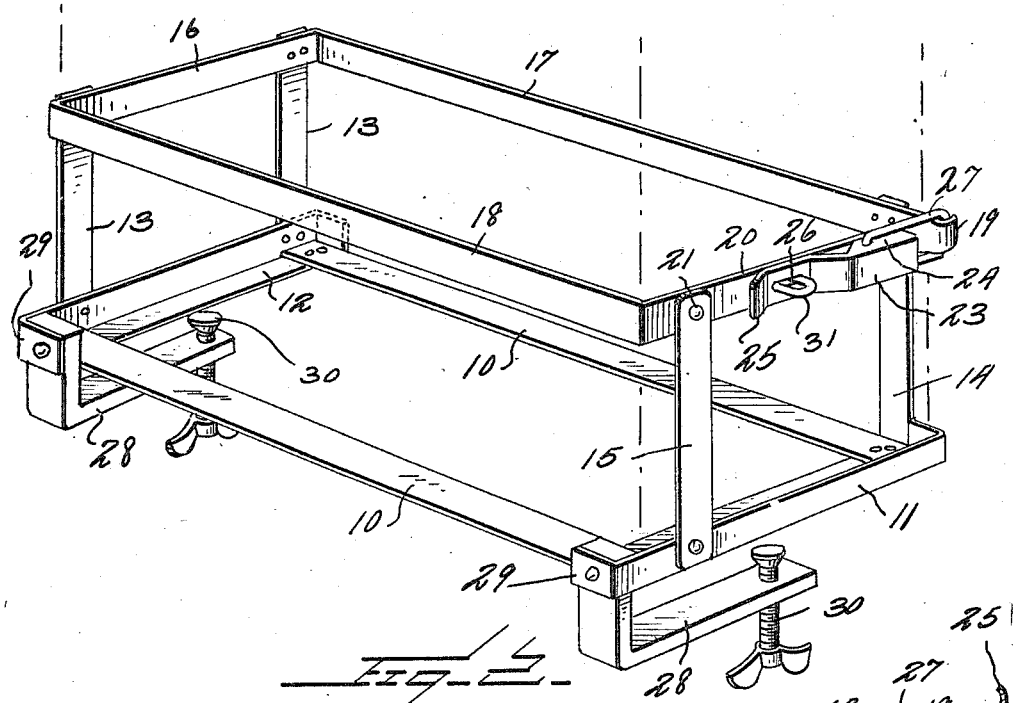
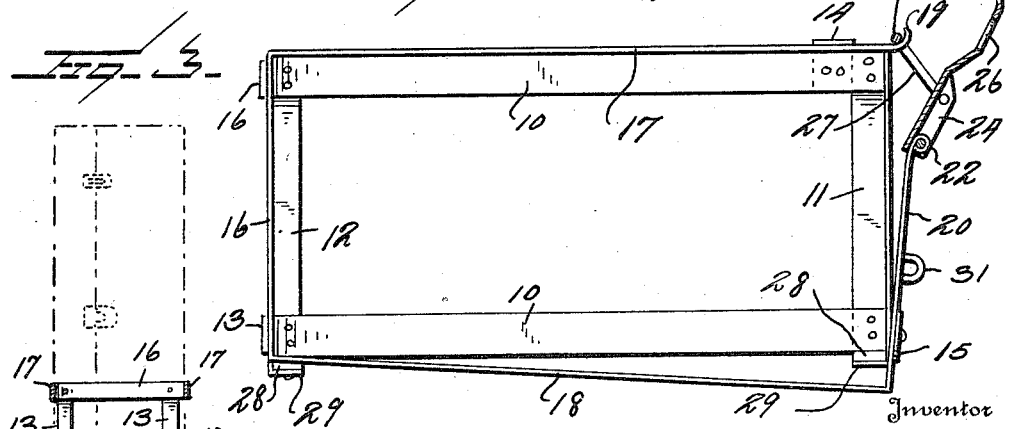
Inventor
C. S. McKenney
By Watson E. Coleman
Attorney Patented Nov. 22, 1927.

1,650,527

UNITED STATES PATENT OFFICE.

CHARLES S. McKENNEY, OF PETERSBURG, VIRGINIA, ASSIGNOR TO SEWARD TRUNK AND BAG COMPANY, OF PETERSBURG, VIRGINIA, A CORPORATION OF VIRGINIA.

TRUNK CARRIER FOR AUTOMOBILES.

Application filed November 30, 1926. Serial No. 151,737.

This invention relates to luggage carriers for automobiles and particularly to a carrier designed for holding trunks, such as steamer trunks, upon the running board of an automobile.

The general object of the present invention is to provide a luggage carrier which may be readily mounted upon or removed from the running board, which is light and strong, and which will hold the steamer trunk in place upon the running board without danger of the trunk or like article becoming displaced from the movement of the car.

A further object is to provide a device of this character which is generally speaking, contractible and expansible, which is adapted to embrace the trunk and then be contracted thereon so as to hold the trunk rigidly in place.

My invention is illustrated in the accompanying drawings wherein:—

Figure 1 is a perspective view of a trunk carrier constructed in accordance with my invention and showing in dotted lines a trunk disposed within the carrier;

Fig. 2 is a top plan view with the trunk carrier opened or expanded, the clamping lever being shown in section;

Fig. 3 is a vertical sectional view through the running board of an automobile, showing my device applied thereto and showing a trunk therein in dotted lines.

Referring to these drawings it will be seen that my trunk carrier comprises a frame consisting of the longitudinally extending base strips 10, the transverse angle irons 11 and 12, to which the ends of the strips 10 are riveted, the vertical strips 13 at one end of the carrier, a vertical strip 14 having its lower end angularly bent and riveted to one of the strips 10, and a vertical strip 15 which is pivotally engaged with the angle iron 11.

Attached to the upper ends of the vertical strips 13 is a transverse strip 16 which is bent to provide the legs 17 and 18 extending longitudinally of the frame. The leg 17 at its free end is riveted to the upright strip 14 and beyond this upright strip is bent to form a rib 19. The other leg 18 at its free end is angularly bent to form a cross piece 20 to which the upper end of the upright 15 is pivoted by means of a rivet 21. This portion 20 extends nearly over to the strip 17. The end of this portion 20 is bent to provide a bead 22 and pivotally engaged with this bead is a clamping member 23 which may be struck up from relatively heavy sheet metal, so as to provide two longitudinally extending flanges 24 and a tongue or hasp 25 which is longitudinally slotted, as at 26.

Pivotally engaged with the flanges 24 is a yoke 27 which is adapted to engage over the lip 19. For the purpose of attaching the frame formed as described to the running board of an automobile, I provide running board clamps consisting of the irons 28 riveted to the bent ends 29 of the angle irons 11 and 12, these irons 28 extending parallel to the angle irons 11 and 12 but spaced therefrom, and carrying at their ends the screw clamps 30 having swiveled heads. Preferably the portion 20 is provided with the outwardly projecting staple 31.

In the use of this device, the frame is mounted upon the running board of an automobile by means of the clamps 28 and the strip or bar 18 permitted, through its resiliency, to expand so that a trunk may be up-ended and set in this frame and then the lever constituted by the part 23, may be rotated upon the fulcrum formed by yoke 27 and the member 17 drawn up toward the member 18, thus clamping the trunk securely in place. The lever 23 may be locked by passing a padlock or other device through the staple 31.

It will be seen that this device is very simple and yet strong, that it is light, that it may be quickly applied to or removed from the running board of an automobile and practice has shown that it holds a trunk, box, or like element, firmly and securely in place upon the running board and against any tendency to be jolted off.

Obviously minor changes might be made in the details of construction and arrangement of parts without departing from the spirit of the invention as defined in the appended claims.

I claim:—

1. A trunk carrier for automobiles including transversely extending end angle irons, longitudinally extending strips engaged with said angle irons, vertical strips attached to one of the end angle irons, a vertical strip attached to the opposite end of one of the longitudinal strips, an approximately U-shaped strip attached at its bight end to the first named upright strips and having one leg attached at its end to the second named upright strip, the other leg having an angularly bent portion extending toward the first named leg, a strip pivoted to this last named portion and to the adjacent angle iron below it, a lever pivoted to the end of the transversely extending portion and having a yoke pivoted to it and engageable with the extremity of the first named leg whereby the legs may be drawn relatively towards each other to thus clamp a trunk within them, and means for clamping the frame upon the running board of an automobile.

2. A trunk carrier for automobiles including transversely extending end angle irons, longitudinally extending strips engaged with said angle irons, vertical strips attached to one of the end angle irons, a vertical strip attached to the opposite end of one of the longitudinal strips, an approximately U-shaped strip attached at its bight end to the first named upright strips and having one leg attached at its end to the second named upright strip, the other leg having an angularly bent portion extending toward the first named leg, a strip pivoted to this last named portion and to the adjacent angle iron below it, a lever pivoted to the end of the transversely extending portion and having a yoke pivoted to it and engageable with the extremity of the first named leg whereby the legs may be drawn relatively towards each other to thus clamp a trunk within them, and means for clamping the frame upon the running board of an automobile and including irons attached to the outer ends of said angle irons and extending downward and rearward therefrom and having screw clamps.

3. A trunk carrier for automobiles including a base having means whereby it may be mounted upon the running board of an automobile and upon which a trunk may be supported, uprights rigidly attached to the base adjacent three corners thereof, a link pivoted to the base for transverse movement in a vertical plane, and disposed adjacent the other corner of the base, an upper rectangular frame having a side portion and an end portion rigidly connected to said uprights and an unattached opposite side and end portion, the latter portion being pivoted to the upper portion of the link and manually operable means for drawing the free end of the upper frame toward the rigidly supported end thereof and holding it in this contracted position.

4. A luggage carrier for automobiles comprising a rectangular rigid base frame, a rectangular frame disposed above and in registry with the base frame, vertical members supporting the upper rectangular frame from the lower frame, the upper frame being of fixed width at one end but expansible and contractible at the other transversely of the length of the frame, and means whereby said upper frame may be contracted at its adjustable end and held in this contracted position.

In testimony whereof I hereunto affix my signature.

CHARLES S. McKENNEY.